(12) United States Patent  
Falcon et al.

(10) Patent No.: US 6,632,094 B1  
(45) Date of Patent: Oct. 14, 2003

(54) TECHNIQUE FOR MENTORING PRE-READERS AND EARLY READERS

(75) Inventors: Mary A. Falcon, Baiting Hollow, NY (US); Ricardo Falcon, Baiting Hollow, NY (US); Jorge V. Juan, Bronxville, NY (US)

(73) Assignee: ReadingVillage.Com, Inc., Baiting Hollow, NY (US)

( * ) Notice: Subject to any disclaimer, the term of this patent is extended or adjusted under 35 U.S.C. 154(b) by 38 days.

(21) Appl. No.: 09/709,182

(22) Filed: Nov. 10, 2000

(51) Int. Cl.[7] .............................................. G09B 17/00
(52) U.S. Cl. ...................... 434/178; 434/167; 434/180; 434/185
(58) Field of Search ............................. 434/156, 157, 434/167, 178, 180, 185, 258, 238, 319, 365, 321, 169, 179, 184, 307 R, 308; 704/270, 271, 1, 7, 2, 4, 5, 8, 10; 345/860; 707/512, 530

(56) References Cited

U.S. PATENT DOCUMENTS

| | | | |
|---|---|---|---|
| 4,078,319 A | | 3/1978 | Mazeski et al. |
| 4,397,635 A | | 8/1983 | Samuels |
| 4,406,626 A | | 9/1983 | Anderson et al. |
| 4,579,533 A | | 4/1986 | Anderson et al. |
| 4,636,173 A | * | 1/1987 | Mossman .................. 434/178 |
| 4,884,972 A | * | 12/1989 | Gasper .................. 434/185 X |
| 4,968,257 A | | 11/1990 | Yalen |
| 5,167,508 A | | 12/1992 | McTaggart |
| 5,256,067 A | | 10/1993 | Gildea et al. |
| 5,275,569 A | * | 1/1994 | Watkins .................. 434/157 X |
| 5,451,163 A | * | 9/1995 | Black .................. 434/178 X |
| 5,486,111 A | * | 1/1996 | Watkins ...................... 434/157 |
| 5,575,659 A | | 11/1996 | King et al. |
| 5,697,789 A | * | 12/1997 | Sameth et al. .......... 434/157 X |
| 5,741,136 A | | 4/1998 | Kirksey et al. |
| 5,810,599 A | * | 9/1998 | Bishop .................. 434/157 X |
| 5,882,202 A | * | 3/1999 | Sameth et al. .......... 434/157 X |
| 5,885,083 A | * | 3/1999 | Ferrell .................. 434/156 X |
| 5,920,838 A | * | 7/1999 | Mostow et al. ......... 704/255 X |
| 5,991,594 A | | 11/1999 | Froeber et al. |
| 6,004,135 A | | 12/1999 | Trattner et al. |
| 6,017,219 A | | 1/2000 | Adams, Jr. et al. |
| 6,022,222 A | * | 2/2000 | Guinan .................. 434/169 X |
| 6,068,487 A | * | 5/2000 | Dionne .................. 434/178 X |
| 6,199,042 B1 | * | 3/2001 | Kurzweil ................ 704/260 X |
| 6,305,942 B1 | * | 10/2001 | Block et al. ............. 434/156 X |
| 6,324,511 B1 | * | 11/2001 | Kiraly et al. ........... 704/260 X |
| 6,332,143 B1 | * | 12/2001 | Chase .................... 707/100 X |
| 6,334,776 B1 | * | 1/2002 | Jenkins et al. .......... 434/169 X |
| 6,554,617 B1 | * | 4/2003 | Dolan .................... 434/169 X |

* cited by examiner

Primary Examiner—S. Thomas Hughes  
Assistant Examiner—Chanda L. Harris  
(74) Attorney, Agent, or Firm—Cohen, Pontani, Lieberman & Pavane (57) ABSTRACT

A computer-implemented techniques for improving reading proficiency. A segment of text is displayed on a video screen. An audio narration of the displayed text is generated from stored audio data derived from a custom reading in natural voice of the entire text segment. The words in the displayed text are highlighted during the audio narration, with each word being highlighted in synchronism to its narration. A visual track is created through the text by highlighting the current word, the previously narrated words and the yet-to-be-narrated words with respectively distinctive highlighting. A phonetic pronunciation with synchronized highlighting of the phonemes is also available. In addition, contextual word definitions are provided.

13 Claims, 7 Drawing Sheets

TECHNIQUE FOR MENTORING PRE-READERS AND EARLY READERS

FIELD OF THE INVENTION

The acquisition of reading proficiency is a cumulative process that requires the guidance of a mentor, commonly a parent or teacher, and practice. The present invention is an audio/visual technique that simulates the guidance of a mentor by presenting customized audio narration together with a video display of printed text having portions thereof highlighted in synchronism with the narration. It is designed to motivate children to practice reading.

BACKGROUND OF THE INVENTION

Educational research has shown that the rate at which a child's reading skills increases is in direct proportion to the amount and frequency with which the child (1) is read to by a mentor and (2) practices reading under the guidance of the mentor.

(1) The Importance of Reading to a Child

In her chapter entitled, "Growing Successful Readers: Homes, Schools, and Communities," Victoria Purcell-Gates, Ph.D., states:

"If we want children to learn the span of concepts about print, including directionality, eye-voice match, and so forth, we need to have children involved in reading and writing attempts of actual connected text. If we want children to learn about the phonemic base of written English, we must involve them in reading and writing attempts that focus them on discovering it through "sounding out" and with the help of teachers who help them do this. Many believe that this is best done at first with phonetically regular words and text (Juel & Roper/Schneider, 1985), and lots of opportunities to read such text in order to internalize the regularities and promote automaticity of word recognition and processing. If we want children to learn about the vocabulary, syntax, and decontextualized natures of different forms of written discourse, then we must read aloud to them from text that is too difficult for them to read on their own."

A variety of reading software and electronic devices have been developed to provide some of the mechanical aspects of reading to a child (e.g., providing the sound of a letter, phoneme, or word on demand and highlighting words while their sounds are played). In their book "Learning to Read in the Computer Age," Anne Meyer, Ed.D., and David Rose, Ed.D., describe the progress made in the usefulness of computer software to improve reading skills:

"Using a computer, students can write, ask a word or letter to say its own name, have a story read, see the lyrics to a song while listening to it . . . No other technology approaches this kind of versatility."

However, room for improvement remains to increase the effectiveness of reading software by adding more of the human aspects of reading to a child. Examples of such human aspects are: reading a story with drama and feeling while pointing to the text as it is read and answering questions about the meaning of words in the story not with dictionary definitions, but with explanations that take the context of the story into account.

(2) The Importance of Practice

Educational research has also shown that reading improvement depends upon the amount of meaningful practice, which in turns depends upon the child's interest in learning to read and willingness to practice. In her chapter entitled "The Three-Cueing System," Marilyn Jager Adams, Ph.D., states:

"As expected, instructional support . . . generally does result in increases in the productivity of [children's] reading. Yet research also has shown that as children's reading experience grows, [their] capabilities tend to grow alongside. That is, to the extent that children do read, they generally learn new words, new meanings, new linguistic structures, and new modes of thought through reading (Stanovich, 1993).The wisdom of the popular dictum that reading is best learned through reading follows directly. So too, however, does the seriousness of its most nettlesome caveat: Where children find reading too difficult, they very often will not do it-or at least not with the sort of engagement that best fosters learning."

Regarding the various approaches that have been developed to support the acquisition of reading proficiency, room for improvement also remains to increase children's motivation to practice by make the process interesting, fun, and frustration-free.

Reading Readiness

An additional need exists for a reading support system capable of instilling "reading readiness" in prereaders. In her book "Beginning to Read, Thinking and Learning About Print," Marilyn Jager Adams, Ph.D., states "The 'reading ready' child enters school with a substantial base of pre-reading skills and a wealth of experience with and knowledge about the pleasures and functions of text and about literary language and styles . . . the likelihood that a child will succeed in the first grade depends most of all on how much she or he has learned already about reading before getting there."

Dr. Purcell-Gates lists the following five dimensions of "reading readiness": (1) intentionality, (2) written register knowledge, (3) alphabetic principle knowledge, (4) concepts of writing, and (5) concepts about print. Research studies show that preschoolers' mastery of these five dimensions is a predictor of their later success in learning to read. Details on each of these five dimensions is provided below.

(1) Intentionality

Children who understand intentionality know that print "says something." They do not have to know what it says; they only have to know that it says something. Thus, when a young child tugs on her mother's sleeve, points to a printed sign (e.g., Exit) over the door in the store and asks, "What does it say?" one may conclude that this child knows that print is a linguistically meaningful system.

2) Written Register Knowledge

Children with written register knowledge possess implicit schemas for the syntax, vocabulary, and reference characteristics of written narrative that are distinct from those they hold for oral speech. Knowledge of written storybook register is knowledge of vocabulary and syntax, and of linguistic ways to maintain meaning within text without reference to the physical world via gesture, intonation, or shared background knowledge.

3) Alphabetic Principle Knowledge

When one masters the alphabetic principle, he or she understands that encoding and decoding English words begins at the phoneme/grapheme level. That is, letters generally stand for individual "phonemes" (speech sounds). Whether one can do this accurately (conventionally map the correct letter to the sound) is beside the point at this stage. Understanding the alphabetic principle is knowing that one must do this to read and write English.

(4) Concepts of Writing

Children who understand concepts of writing conceptualize writing as a system. To measure children's understanding of concepts of writing, researchers hand them pencil and paper and asked them to "Write your name and anything else you can." Those children with a strong grasp of the concept of writing, write words or pseudo-words. Children who score lowest on this task draw pictures, scribbles, lines around the border of the page, etc. Children who understand concepts of writing know the difference between printed text and illustrations and decorations in a book.

(5) Concepts About Print

Children who understand concepts about print understand that marks called "letters" make up "words," and "words" make up "sentences" that are marked by periods, question marks, and exclamation marks. They know that these marks are written, and read, beginning at the top left corner of the block of print and across horizontally to the top right corner, at which point one returns to the left end of the line underneath the one just finished, and so on. They know that letters are different from numbers and pictures and that their shapes, orientations and identities are stable across time and across contexts.

Progress in these five dimensions can be attained with one-on-one reading sessions for the child by, for example, a family member or a teacher. However, this has obvious inherent limitations involving availability, time, expense, convenience and so on. Computers have been looked at as a potentially useful tool to use in this task, and there are a number of useful computer reading programs available on CD-ROMs. However, a more multifaceted and versatile computerized system is needed than any yet devised in terms of its ability to both enhance reading readiness in preschoolers and support the goals of formal reading curricula in English-speaking public and private schools around the world, regardless of whether their teaching approach emphasizes whole-language, phonetics, or reading recovery.

SUMMARY OF THE INVENTION

One object of the present invention is to simulate story reading by a human mentor in order to instill reading readiness in prereaders and to increase early readers' understanding of the relationship between written and oral language.

Another object of the invention is to provide mentoring support for the development of sounding-out skills in early readers.

Another object of the invention is to provide early readers with enjoyable, frustration-free reading practice.

Another object of the present invention is to help early readers improve both vocabulary and comprehension by providing the meanings of vocabulary words within the context of text passages.

These and other objects are attained in accordance with one aspect of the present invention directed to a computer-implemented technique for improving reading proficiency. A text is displayed on a video screen, and an audio narration of the text is generated from stored audio data. The words in the displayed text are highlighted during the audio narration generating operation, wherein highlighting includes distinctly displaying a current word to visually indicate that it is being narrated, displaying a group of words narrated prior to the current word in a manner distinct from the current word, and displaying a group of words yet to be narrated after the current word in a manner distinct from the current word and the words narrated prior to the current word.

Another aspect of the present invention is directed to a computer-implemented technique for improving reading proficiency. A text is displayed on a video screen, and access is provided to stored audio data related to parts of words in the text. In response to user selection of a particular word from the text, the stored audio data corresponding to the parts of said particular word is retrieved, and a part-by-part pronunciation of the particular word is generated from the retrieved audio data. Each of the parts is highlighted in the displayed text as the pronunciation of such part is being generated from the retrieved audio data corresponding thereto.

Another aspect of the present invention is directed to a computer-implemented technique for improving reading proficiency. A text is displayed on a video screen, and access is provided to stored audio data representing narration of definitions for words in the text, wherein more than one definition is stored for any word used within the text in more than one context. Words in the text are associated with the definitions, respectively, such that a word with more than one definition is associated with a corresponding contextual definition thereof. In response to user selection of a particular word from the text, the stored audio data representing the definition associated therewith is retrieved, and an audio narration is generated from the retrieved audio-data.

Another aspect of the present invention is directed to a computer-implemented technique for improving reading proficiency. A text is displayed on a video screen, and access is provided to stored audio data representing a narration of the text. An audio narration of the text is generated from the stored audio data, and words in the displayed text are highlighted during the audio narration generating operation, wherein each word is highlighted in relation to its narration during the reproducing operation.

Embodiments implementing the above-mentioned techniques of the invention can take various forms, such as method, apparatus, article of manufacture and a signal.

DETAILED DESCRIPTION OF THE DRAWINGS

It is contemplated that the invention will be implemented with a computerized system that would typically include a personal computer, a keyboard and/or a mouse, a monitor, and one or more speakers. Some data storage capacity on a computer-readable medium is required. A computer-readable medium is any article of manufacture that contains data which can be read by a computer or a carrier wave signal carrying data that can be read by a computer. For example, code corresponding to the computer program and/ or databases, etc. to enable execution of the various required computerized operations in accordance with the invention may be stored and distributed on magnetic media, such as floppy disk, flexible disk, hard disk, reel-to-reel tape, cartridge tape and cassette tape; optical media, such as CD-ROM and writable compact disk; and paper media, such as punched cards and paper tape; memory chips such as a RAM, a PROM, an EPROM, a FLASH-EPROM; or on a carrier wave signal received through a network, wireless network, or modem, including radio-frequency signals and infrared signals.

Figure 1:
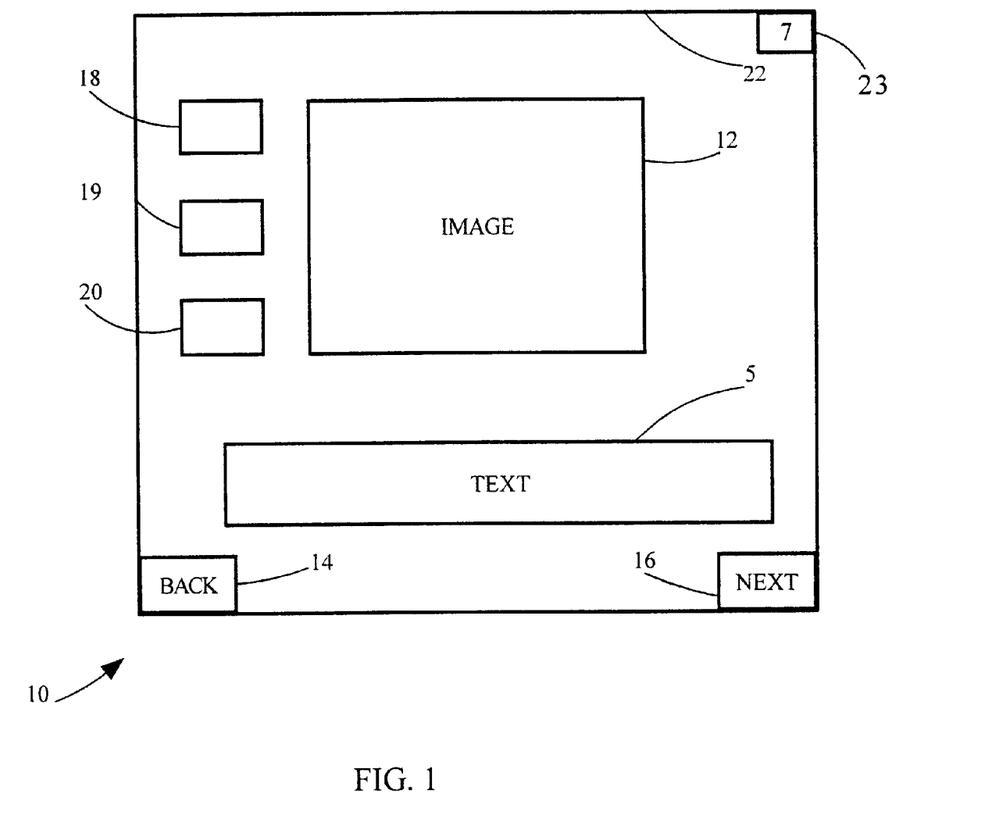
FIG. 1 shows the screen of a monitor displaying a page with an image and text on it which together tell a story.

One particularly advantageous utilization of the invention is with prereaders. Consequently, details of the present invention will be provided in connection with that environment, although it will be understood that the invention is not limited thereto. As shown in FIG. 1, printed text, represented by box 5, is displayed on a monitor 10 together with an image, represented by box 12, which displays a still picture. Text 5 and image 12 together tell a story, as in an illustrated children's book. Just as with a real book, such an electronic "book" would have multiple pages that can be flipped through by using the "back" button 14 and the "next" button 16. Box 12 also serves as a "button" that can be clicked to activate an audio and/or video file associated with the image. For example if the image shows a bird, when box 12 is clicked it might trigger the sound of the bird's call and/or a video of the bird in flight.

In addition to the text 5 and image 12, the monitor displays a template with "buttons" 18, 19 and 20 that can be clicked to select certain functions or features. Box 23 accommodates the number of the page being displayed. Buttons 14 and 16 are also parts of this template. Thus, the template as displayed on monitor 10 is common to all the pages, whereas the text and/or image, as well as the page number of course, vary from page to page.

Figure 2:
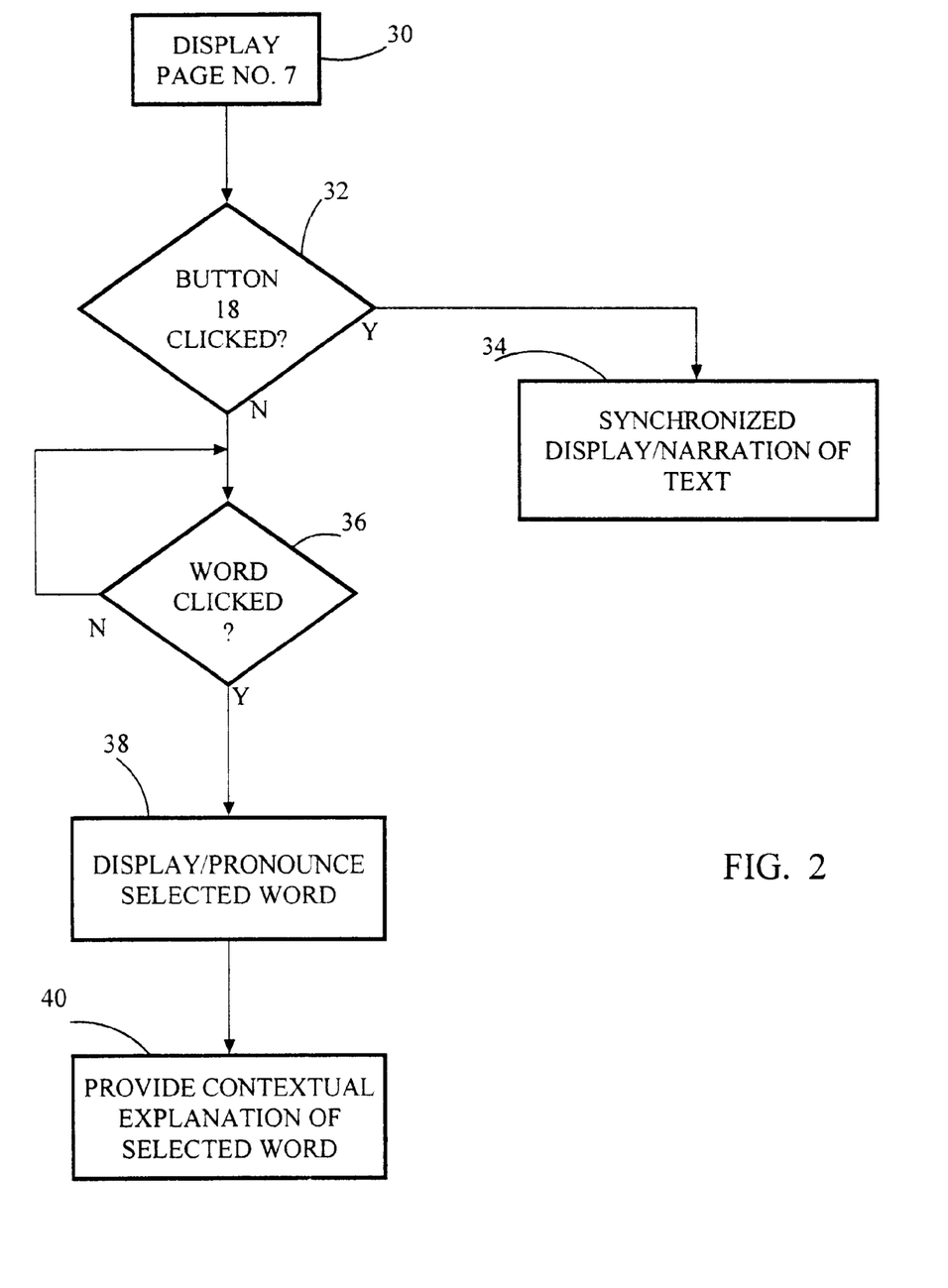
FIG. 2 shows a flow chart of the basic functions performed in accordance with the invention.

FIG. 2 presents an overview of the present invention. Three audio/visual features are provided that are designed, for example, to help children decode and comprehend printed text, with a particular page, such as page 7 (see box 23 in FIG. 1), being displayed, as per step 30. The first feature can be actuated by clicking button 18, per step 32. Then, each successive word of printed text in box 5 is visually highlighted in synchronization with natural-voice audio reading, or narration, of the text, per step 34. The second feature allows the child to select, or click on, individual words within the text, per step 36, and to hear them pronounced, per step 38. Button 19 is an On/Off switch. Various such buttons are well known which indicate their status as being On or Off. When clicked to the On status, the button allows the prereader to hear the word pronounced first phonetically, then as a whole word. By clicking the button to the Off status, better readers can skip the phonetic pronunciation and hear only the whole word spoken. The third feature can be actuated after the completion of the second feature, by clicking button 20. Then, the natural-voice audio provides a contextual explanation of the selected word, per step 40. (The terms "definition", "explanation" and "meaning" as used herein with respect to the invention when referring to words of the displayed text are intended to be used interchangeably). The invention will now be described in greater detail.

First Feature: Synchronized Display/Narration of Text

Figure 3:
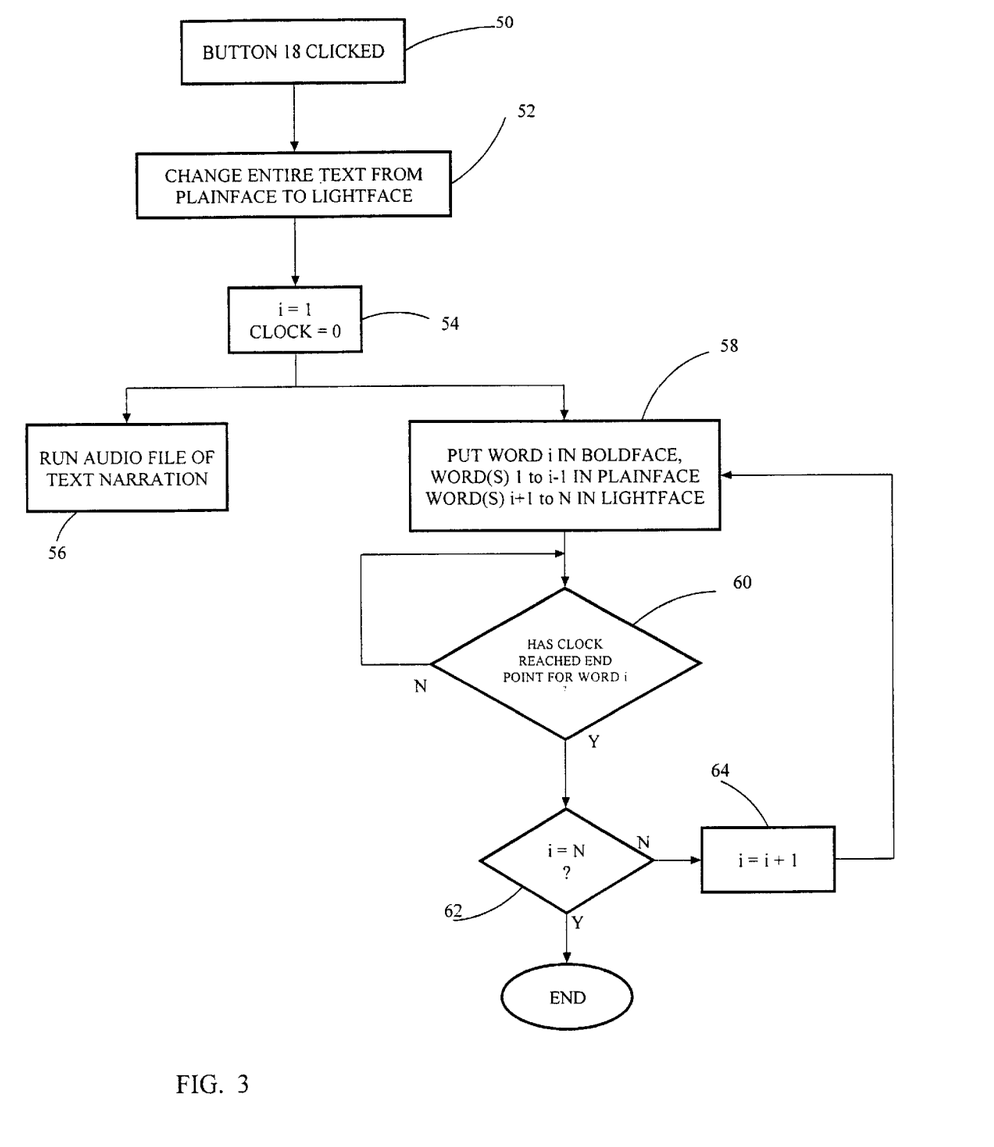
FIG. 3 shows a flow chart for performing sequential highlighting of text in synchronism with its narration.

FIG. 3 shows details of operation 34. With this feature, portions of the text are highlighted in synchronization with a story-telling style of audio narration, so that the child simultaneously sees each word in the context of the text around it and hears it spoken in the context of the story. The normal shading for displaying text on a monitor is referred to herein as plainface. When a designated button on the screen (i.e. button 18) is clicked to actuate this synchronized display/narration of text feature, as per step 50 of FIG. 3, the text on the screen fades into a shade lighter than plainface, referred to herein *s lightface, as per step 52. This shade is used to denote words that have not yet been narrated.

In step 54, a clock is set to time zero, and the number i (where i represents the position of the word being spoken within the text) is set to 1 to designate that the segment of the audio file for page 7 that contains the narration for the displayed text of N words is about to start. As the clock begins to run, steps 56 and 58 are started simultaneously. Running the audio file reproduces the narrator reading the text in a conversational voice, as per step 56. As the narrator says each successive word i, step 58 synchronously displays the particular word being spoken in boldface, i.e. in a darker shade than plainface. As the next word (i+1) is spoken and boldfaced, the word(s) that have already been spoken appear in plainface. The words not yet read remain in lightface. This system of highlighting creates a visual trail through the text, showing the reader at any given moment the specific word being currently read (i.e. the boldfaced word), the part of the text that has already been read (i.e. the text in plainface), and the part of the text that has yet to be narrated (i.e. the text in lightface).

As the clock continues to run, decision box 60 checks whether the end point of the audio for word i in the audio file has been reached. As explained below, a database is created which stores the end point in the audio file for each of the N words in the displayed text. If the end point has not yet been reached, step 60 continues to cycle. If the end point of word i has been reached, decision box 62 checks whether the portion of the audio file containing word i is the last portion of the audio file for that page. If so, then operation 34 ends. If not, then the number i is replaced with the next number, per step 64, and highlighting step 58 is performed for the new word corresponding to that number i.

Techniques are known in the prior art which provide word-by-word sequential highlighting of printed words synchronized with spoken words. As a word is spoken, it is highlighted within the text on the screen. Reading research has shown that this helps children understand the connection between print and oral speech. The present invention is a multifaceted reading-readiness support system that improves upon straightforward audio/visual synchronization with at least the following three additional and unique features: (1) the use of custom-recorded, natural story-telling speech as the audio component, (2) custom-synchronization of the custom-recorded audio with text highlighting, so that the highlighting becomes a simultaneous visual representation of the tone and mood expressed by the natural voice narration, and (3) the creation of a visual trail through the text via the use of plainface, lightface, and boldface type in the highlighting of words. Each of these is explained in greater detail below.

(1) Custom-Recorded, Natural Story-Telling Speech as the Audio Component

The added dimension of story-telling narration helps children to discover that print can convey the same information, meaning, and mood that oral speech conveys. Perhaps the best way to explain the uniqueness of such audio support is to compare how the following text would be treated by the invention and by the prior art:

"What is your name? What? I can't hear you."

In prior art systems, the audio reproduction of the first "What" sounds the same as the audio reproduction of the second "What" in the text. This is because in such prior art systems, words are prerecorded and stored in a database as individual audio files. The individual audio files are combined again and again to form sentences. Because there is only one recording of a given word, a word always sounds the same regardless of its contextual meaning.

With the present invention, the narration of this entire passage is stored in the database as one unique audio file. The audio file for this passage is not used for any other passage. In the present invention, the audio reproduction of the first "What" is short and simple. The audio reproduction of the second "What" is louder, longer, and ends at a higher pitch to form a question (i.e. "What?"). This variation in the audio treatment is made possible by the present invention because all audio support is custom recorded, i.e. specially narrated for each printed text. Each different text, e.g. story, is read by a narrator who reads the way an actor reads his lines, with variations in emphasis, volume, and tone to convey drama, meaning, and feeling.

(2) Custom Synchronization of Audio and Text Highlighting to Create a Visual Representation of the Feelings expressed by the Narrator In the present invention, not only is the audio that accompanies each text passage custom-recorded, but the audio and text-highlighting is custom-synchronized as well. Due to this unique procedure, the highlighting of the text becomes a visual representation of the variations in emphasis and mood expressed simultaneously by the natural voice audio narration.

To demonstrate the different processes of audio/text synchronization in the prior art and in the present invention, as well as the different results, consider again the word "what" in the text passage:

"What is your name? What? I can't hear you."

In real speech, the word "what" not only sounds different the two times it is spoken, it also takes up a different amount of real time each time it is spoken. Whereas the present invention simulates and reflects these differences in both the audio and the visual highlighting of the text, prior art systems do not.

In the prior art, as stated earlier, words are pre-recorded and kept in a database of individual audio files. The necessary audio files are selected to accompany a passage. Those audio files are triggered to open, run, and close, one after the other. The closing of each audio file triggers the highlighting of the next word in the text. The amount of real time that each word is highlighted is dictated by the amount of real time it takes to run the corresponding audio file. Because "what" appears twice, the audio file for that word has simply been plugged in at two different places. Since each time the audio file of "what" plays it runs for the same amount of real time, each time the word comes up in the text passage, it stays highlighted for the same amount of real time.

In contrast, with the unique process employed in the present invention, the recorded narration of this passage is digitized and saved as a single audio file. A sound engineer marks the digital file to show where the sound of each of the words in the passage has ended (as explained below). Each successive mark dictates the stopping of the text highlighting of that word and the starting of the text highlighting of the next word. Since the audio segment "What?" in "What? I can't hear you." takes more real time to run than the segment "What" in "What is your name.", it causes the text "What?" in the passage "What? I can't hear you." to stay visually highlighted for a greater amount of real time than the "What" in "What is your name." The result of this unique procedure is that the highlighting of the text appears to the viewer as animation that dances along in rhythm with the audio narration. The highlighting in effect becomes a visual representation of the feelings expressed by the narrator.

(3) Use of Different Typefaces in the Highlighting of Text

The creation of a trail through the printed text via the use of plainface, boldface, and lightface type in the sequential highlighting helps children understand the tracking conventions of written English and to correctly develop visual sequencing skills-i.e., to begin "reading" at the top left corner of a block of text, move left-to-right along a single line, drop down to the next line, then back to the left margin, and move left-to-right again. The tracking of printed text is considered by reading educators to be an important part of reading readiness. The tracking feature of the present invention also assists those children with reading disabilities, such as dyslexia.

Second Feature: Display/Pronunciation of a Selected Word

At any time, except while a synchronized narration/text highlighting is in progress, a child can click on individual words in the story text displayed in text box 5 and hear them pronounced. The way in which the words are pronounced is controllable to be set in one of two modes. In the first mode, a word that has been selected by clicking the text is pronounced only once in whole word form. In the second mode, the selected word is first broken down at the phonetic level (individual phonic elements are highlighted and pronounced in sequence), and then presented as a whole word (highlighted and spoken synchronously). For example, first "water" is visually and auditorily separated into its phonetic parts, namely "wuh . . . ah . . . teh . . . err . . . ". Then, the whole word "water" is highlighted and an audio file of the entire word is run, in order to pronounce this word in its entirety.

Figure 5:
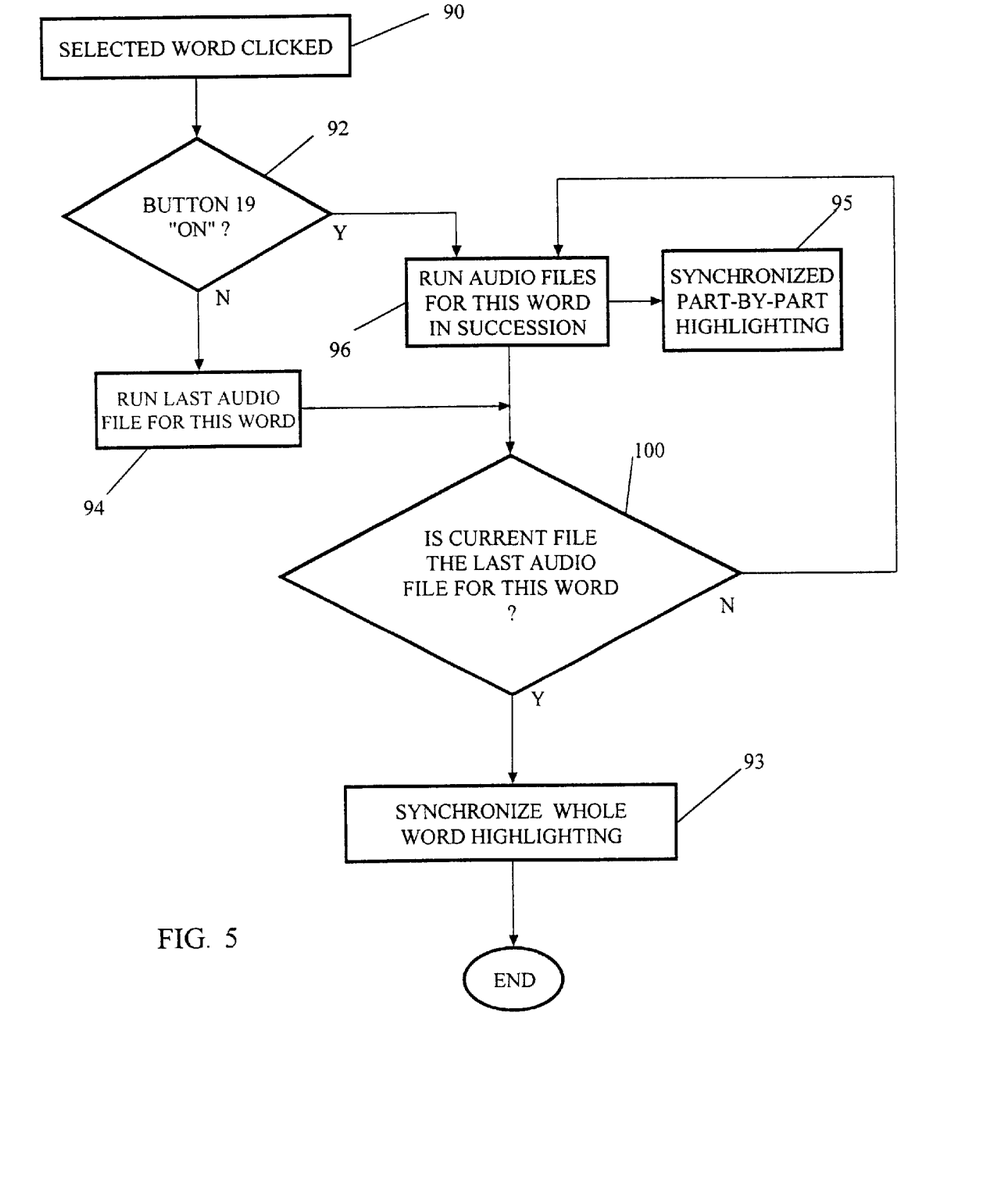
FIG. 5 shows a flow chart for pronouncing a selected word synchronized with a sequential highlighting of its phonetic parts.

FIG. 5 provides additional details corresponding to step 38 in FIG. 2 pertaining to this second feature. More specifically, when step 36 in FIG. 2 indicates that a word has been selected, step 90 identifies that word and initiates a sequence of steps resulting in a pronunciation of the selected word. That pronunciation can be either as a whole word or as part-by-part, as explained above. Control of this feature is via button 19. If button 19 is clicked to the Off position, each word selected thereafter is pronounced only as a whole word. If button 19 is clicked to the On position, each word selected thereafter is first pronounced part-by-part, followed by the whole word being spoken. Taking the word "water" for example, the sound for each of the phonemes in the word and the sound for the whole word are pre-recorded and kept in a database of five individual audio files: (1) wuh (2) ah (3) teh (4) err (5) water. Thus, if decision box 92 results in a negative answer, i.e. button 19 is Off, the last audio file for this word is opened, per step 94. As the file opens, inquiry 100 determines that it is the last file in the database, thus triggering the highlighting of the whole word in synchronism, as per step 93.

If the answer to inquiry 92 is positive, when the word "water" is selected out of the text in box 5, those five audio files are triggered to open, run, and close, one after the other in succession, as per step 96 of FIG. 5. The opening of each audio file triggers the end of the highlighting of the previous phoneme and the highlighting of the current phoneme, as per step 95. As each of the audio files opens, inquiry 100 searches the database to determine whether or not the open audio file is the last file in the database for that word. If it is determined to be the last, then the whole word is highlighted in synchronism with the running of the audio file as per step 93. Thus, if button 19 is Off, the entire word is pronounced. However, if button 19 is On, the word is pronounced twice; once as a part-by-part phonetic pronunciation, and then as a whole word.

Third Feature: Contextual Word Definitions

This feature provides simple contextual definitions of words that are clicked on for pronunciation. After a child clicks on a word to hear it pronounced, she can click on button 20 to hear an explanation of the selected word regarding its meaning within the context of the specific passage. Button 20 can be labeled on the screen with "What does it mean?"

Figure 6:
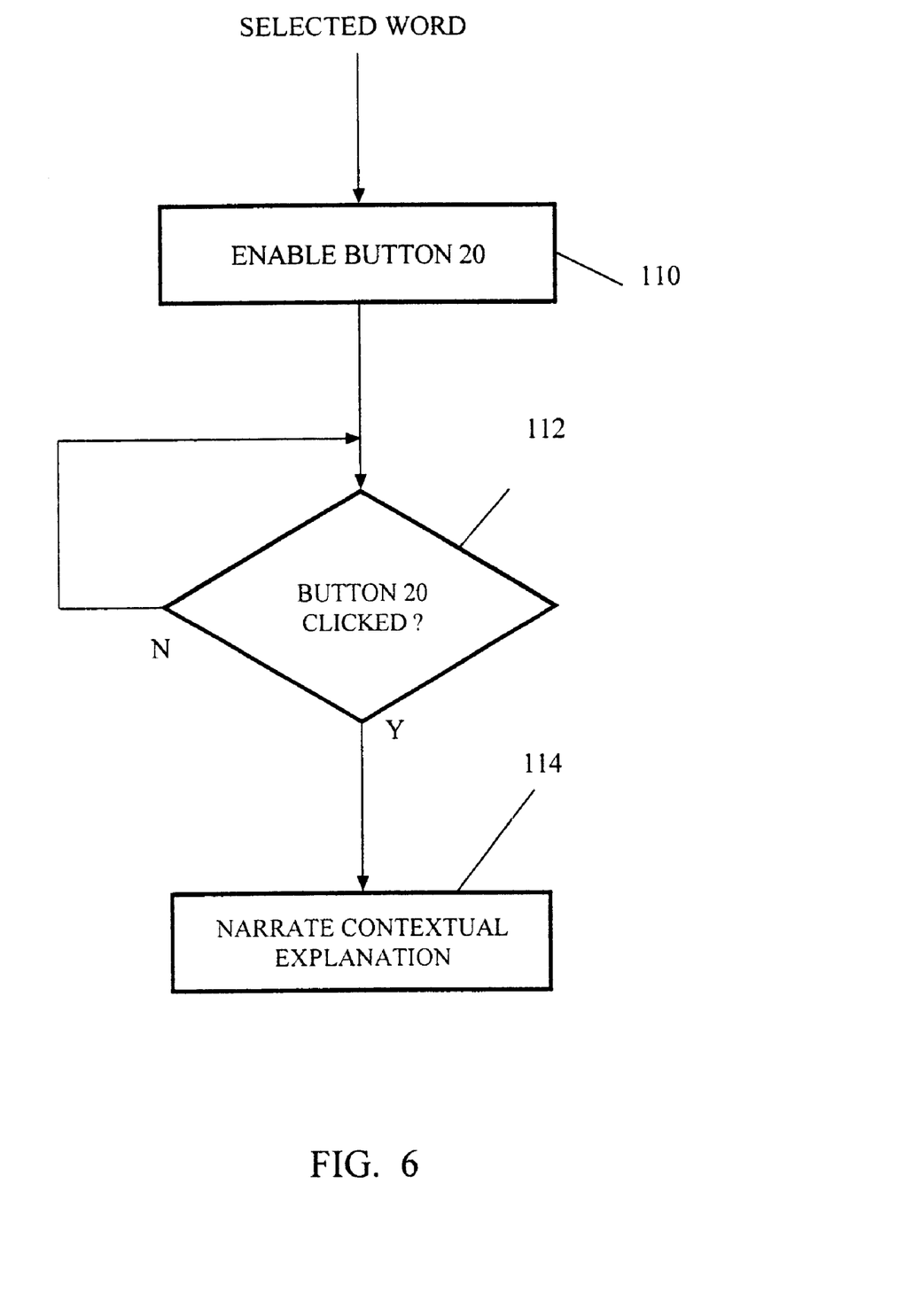
FIG. 6 shows a flow chart for providing a contextual explanation of a selected word.

Details of step 40 in FIG. 2 for this feature are provided in connection with FIG. 6. The selected word is known from step 90. The selection of a word enables the button 20, per step 110. In other words, prior to the selection of a word, clicking on button 20 is ineffective. However, after a word had been selected, and when step 38 has been completed, button 20 is rendered active so that when clicked per step 112, the audio file for the corresponding explanation is retrieved and the audio is reproduced, i.e. read, per step 114. The explanation is taken from an audio database specifically created, narrated and stored for the word in the context of this page.

Unlike a dictionary definition, the explanation provided in accordance with the invention tells the child only what he needs to know to understand the meaning of the word in the context of the sentence and the story. For example, in the sentence, "'You are right,' said Bobby Bear", the explanation provided for the word "right" refers only to the meaning that concerns correctness; it does not mention that "right" can also mean a direction opposite to left. Designed this way, the feature more closely resembles what a human mentor reading with a child would do.

Databases

Figure 4:
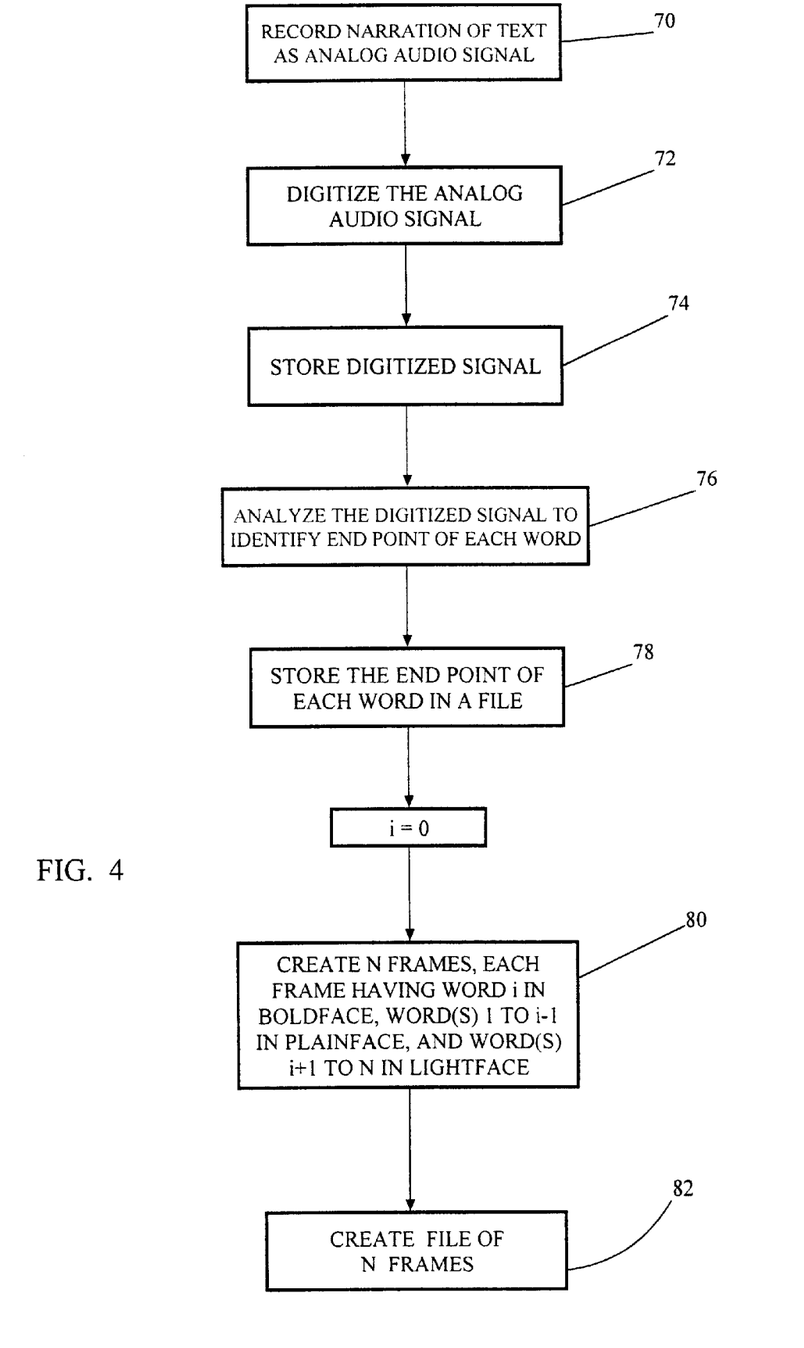
FIG. 4 shows a flow chart for creating computer files to enable the sequential highlighting of text in synchronism with its narration.

Creation of the databases required to implement the first feature in accordance with the description provided above with regard to FIG. 3 is set forth below. As shown in FIG. 4, before the electronic "book" is ready for display/narration to readers, a narration of the text on each page is recorded as an analog audio signal, per step 70. The recording for each page will be separately addressable for enabling selective retrieval thereof. The following description will be made with regard to the analog audio signal pertaining only to a single page, with the understanding that the same operations will be applied with respect to the text of all the other pages in the "book".

The recorded analog audio signal of the text narration (with all of the appropriate intonation, modulation, etc.) is converted per step 72 to a digital signal, and this is stored per step 74. This digitized sound is part of a database that can be accessed per step 56 in order to reproduce the recorded narration when the first feature is actuated by the reader.

Figure 7:
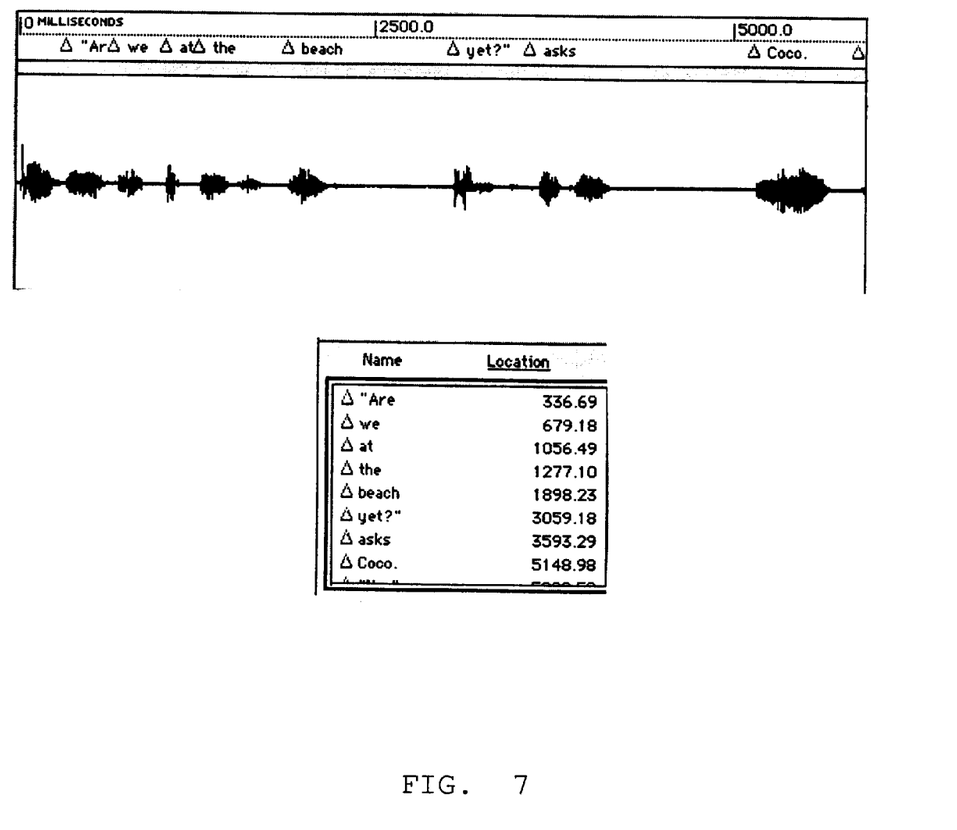
FIG. 7 shows an amplitude vs time graph of the audio signal juxtaposed with the corresponding text for use in identifying the end point in the audio signal for each word in the text.

The stored digitized sound is processed per step 76 to identify each individual word of the narrated text. This can be either an automated or a manual process. As to the latter, for example, a graph of the audio signal corresponding to the narrated text can be electronically displayed overlaid on a time scale and juxtaposed with the words of the text. As can readily be seen, each word has a certain signal amplitude and duration, and in the gap between words the amplitude drops to near zero. It is possible for an operator to view this displayed signal of the text narration and to identify the end time for each word by the point at which the amplitude drops to near zero. An example of such an audio signal displayed together with the text and a time scale is shown in FIG. 7. The text is "'Are we at the beach yet?' asks Coco." Under the graph is a list of all of the words in one column, and opposite each word in the second column is its end point (or cue point).

The end points for all of the words are recorded (as in the table shown in FIG. 7) and then stored in a file, per step 78. Thus, the file will identify the word by page number, word number, and end time. So far, a database has been created per step 74 of the stored digitized sounds. Also, a data base for the end times of the recorded words has been created, as per step 78.

Step 80 describes the creation of frames. A frame is used to display text 5 and image 12 on monitor 10. Thus, since the same image 12 is used in connection with all of the words in the text, all of the frames have the same image. The only variable is the text as it appears at any given time with regard to which words are in plainface, boldface, and lightface. Because the sequencing in which the highlighting proceeds is on a word-by-word basis, a text with N words will have N frames. In frame no. 1, word no. 1 will be in boldface and words 2 to N will be in lightface. Frame no. 2 will have word no. 2 in boldface, word no. 1 in plainface, and words 3 to N in lightface. This can be stated more generally as follows: word i is in boldface, words 1 to (i–1) are in plainface, and words (i+1) to N are in lightface.

Software programs are available to create such frames. One example is the application Flash, available from Macromedia. Thus, as a result of step 80, N frames are created and stored so as to be individually addressable and accessible. The creation of a file of N frames is represented by step 82.

Taking another look at FIG. 3 in view of the just-described FIG. 4 reveals that step 58 is implemented with the frames stored by step 82. The synchronism between the audio narration of step 56 and the highlighted text portions displayed by step 58 is derived via the clock. Thus, inquiry 60 searches the database created by step 78 for the end point of each individual word in the audio file. While that word is being narrated per step 56, that same word is displayed in boldface by the corresponding frame for as long as the time end point for that word is not reached. Once that end point is reached, as determined by step 60, step 58 then proceeds to the next frame in the file stored by step 82 so that as the narration continues to the next word, the boldfacing of that word occurs in synchronism with its narration.

For the part-by-part and/or whole word pronunciation described in connection with FIG. 5, a database of words that are sounded out phonetically, then pronounced in whole-word form is used. Taking the word "water", as in the example presented above, each of the phonemes in the word and the whole word are prerecorded and stored in a database of five individual audio files associated with this word, namely (1) wuh (2) ah (3) teh (4) err (5) water. Thus, this word will sound the same when it is reproduced regardless of the sentence and text of which it is a part.

An additional database is required for the audio narration of vocabulary word definitions. For example, each vocabulary word could have a set of definitions therefor to correspond with the various usages of that word in context. The definitions are narrated in the same way as the text on the screen is narrated, and the audio is stored in audio files. Each instance of the word in the text would be associated with the appropriate definition from that stored set of definitions.

Mastery of five dimensions of written language with the invention

The above-discussed five dimensions of written language knowledge, regarded to be predictive of future school success are addressed by the present invention. Each of the five dimensions is discussed below to show how the present invention helps the child master that dimension.

(1) Intentionality

By listening to audio narration of the story while watching the text of the story as it is highlighted in synchronization with the audio, the child gets the clear message that this print "says something."

(2) Written Register Knowledge

Written register knowledge is a broad understanding that children eventually gain through repeated reading experience after they have become fairly efficient at decoding words. However, according to Purcell-Gates, prereaders who are read to frequently gain this understanding, along with the other dimensions of reading readiness, sooner. Also, these children learn to read faster than their peers when they begin their formal schooling. The display/narration of text in accordance with the invention serves this purpose, as it provides reading experience to children regardless of their ability to read on their own.

(3) Alphabetic Principle Knowledge

For the prereader, the display/pronunciation of a selected word feature of the invention provides a model of effective reading technique by illustrating the relationship between printed letters and phonemes. This feature helps the early reader to understand mapping strategies and master essential sequencing, decoding and blending skills on his own.

(4) Concepts of Writing

Although the invention does not involve the child in writing, it is designed to support the child's emerging concepts of writing. Clicking on a word in the text activates the audio pronunciation of the word. In the display/narration of text feature, only the text is animated. Clicking on the picture (box 12 in FIG. 1) activates animation and/or sound effects (e.g., a bear in the picture might open his mouth and roar), but this function cannot be activated simultaneously with the display/narration of text feature. Organizing the visual and audio in this way helps children understand the difference between printed text and illustrations.

(5) Concepts About Print

No other reading system provides as many levels of support as the present invention. The display/pronunciation of a selected word feature teaches children that "marks called letters make up words." The display/narration of text feature teaches children that "words make up sentences," and the natural voice audio narration teaches them not only that "sentences are marked by periods, question marks, and exclamation marks," but it teaches them what those punctuation marks mean. The highlighting of words in plainface, boldface, and lightface type to create a trail through the text is specifically designed to support children's emerging understanding of the tracking conventions of written English.

With the present invention, children can get as much or as little help as they need, without frustration, under the uncritical, ever-patient mentoring of the computer. The present invention offers unique simulations of reading support that heretofore could only be supplied by human mentors.

Although a specific embodiment of the present invention has been described in detail above, it will be apparent that various modifications thereto will readily occur to anyone with ordinary skill in the art. For example, rather than having all the hardware, software, data, etc. required to implement this invention located in one PC and/or at one location, the invention can be implemented on a website. The website resources provide all the functionality elements that are required, and the remote user actuates the desired operations to pick a "book", flip to a page, generate text narration with synchronized text highlighting, select a particular word to have it pronounced and/or hear its definition, and so on. Other contemplated platforms for implementing this invention include toys and specialized electronic reading devices. Also, the type of highlighting could be changed so as to put the already-narrated text (i.e before the current word before i) in lightface and the yet-to-be narrated text (i.e. words i+1 to N) in plainface. Furthermore, colors could be used (of the lettering or the background) instead of line density for highlighting the words. Any and all types of highlighting can be considered, such as different fonts, capitalization vs. lower case, superscript vs. subscript, and so on. Although the text has been described as being narrated (the words "read" and "spoken" have also been used and are intended to have the same meaning), the text could also be sung, such as when the audio includes music and the "narrator" is singing. The word "narrated" is intended to include all ways in which a comprehensible sounding of the text can be made. The breaking of words into their parts has been described as being phonetic, but it could also be syllabic. In addition, when a child clicks a word to receive an explanation, a textual explanation of the word could be presented on the screen instead of, or along with, the audio described above. The child could click on the textual explanation to hear it read by the narrator. Also, the database of end points for the words in the text can be identified automatically rather than manually. Software can readily be used to search for predetermined parameters in the stored audio file of the text, such as the signal amplitude dropping below a specified threshold for a given time duration. In addition, rather than using word end points, start points could be used. Furthermore, not only reading proficiency can benefit from use of this invention. It can applied to teach foreign languages as well as English as a second language. Box 12 could display a video clip. The database for the part-by-part pronunciation could contain only the phoneme audio, and these can be blended together to form the whole spoken word, thereby dispensing with the need for recording the sound of the entire word. These and other such modifications are intended to fall within the scope of the present invention as defined by the following claims.

We claim:

1. A computer-implemented method for improving reading proficiency, comprising:

displaying a text on a video screen;

generating an audio narration of said text from stored audio data; and simultaneously highlighting words in said displayed text during said audio narration generating operation, wherein said highlighting includes:

distinctly displaying a current word to visually indicate that it is being narrated, displaying a group of words narrated prior to said current word in a manner distinct from the current word, and displaying a group of words yet to be narrated after said current word in a manner distinct from the current word and the words narrated prior to the current word.

2. The method of claim 1, wherein said current word, said group of prior-narrated words and said group of yet-to-be-narrated words are each highlighted in a different one of lightface, plainface and boldface type.

3. The method of claim 1, wherein said group of prior-narrated words consists of all the prior narrated words.

4. The method of claim 1, wherein said group of yet-to-be-narrated words consists of all the yet-to-be-narrated words.

5. An article of manufacture for use in a computer system comprising a computer usable medium having a computer readable code means for causing:
   displaying a text on a video screen;
   generating an audio narration of said text from stored audio data; and
   simultaneously highlighting words in said displayed text during said audio narration generating operation, wherein said highlighting includes:
   distinctly displaying a current word to visually indicate that it is being narrated,
   displaying a group of words narrated prior to said current word in a manner distinct from the current word, and
   displaying a group of words yet to be narrated after said current word in a manner distinct from the current word and the words narrated prior to the current word.

6. A computer data signal embodied in a carrier wave, comprising:
   a first code segment for displaying a text on a video screen;
   a second code segment for generating an audio narration of said text from stored audio data; and
   a third code segment for simultaneously highlighting words in said displayed text during said audio narration generating operation, wherein said highlighting includes:
   distinctly displaying a current word to visually indicate that it is being narrated,
   displaying a group of words, narrated prior to said current word, in a manner distinct from the current word, and
   displaying a group of words, yet to be narrated after said current word, in a manner distinct from the current word and the words narrated prior to the current word.

7. Apparatus for improving reading proficiency, comprising:
   means for displaying a text on a video screen;
   means for generating sounds related to said text from stored audio data; and
   means for simultaneously highlighting words in said displayed text during said sound generating operation, wherein said highlighting includes:
   distinctly displaying a current word to visually indicate that sound related thereto is being narrated,
   displaying a group of words, sounded prior to said current word, in a manner distinct from the current word, and
   displaying a group of words, yet to be sounded after said current word, in a manner distinct from the current word and the words sounded prior to the current word.

8. A computer-implemented method for improving reading proficiency, comprising:
   displaying a text on a video screen;
   providing access to stored audio data representing narration of definitions for words in said text, wherein more than one definition is stored for any word used within said text in more than one context;
   associating words in said text with said definitions, respectively, such that a word with more than one definition is associated with a corresponding contextual definition thereof; and
   in response to user selection of a particular word from said text,
   retrieving the stored audio data representing the definition associated therewith, and
   generating an audio narration from the retrieved audio data.

9. The method of claim 8, wherein the stored audio data is derived from a custom reading with natural speech of the word definitions.

10. The method of claim 8, wherein one definition is stored for each contextual usage of a word in said text.

11. An article of manufacture for use in a computer system comprising a computer usable medium having a computer readable code means for causing:
    displaying a text on a video screen;
    providing access to stored audio data representing narration of definitions for words in said text, wherein more than one definition is stored for any word used within said text in more than one context;
    associating words in said text with said definitions, respectively, such that a word with more than one definition is associated with a corresponding contextual definition thereof; and
    in response to user selection of a particular word from said text,
    retrieving the stored audio data representing the definition associated therewith, and
    generating an audio narration from the retrieved audio data.

12. A computer data signal embodied in a carrier wave, comprising:
    a first code segment for displaying a text on a video screen;
    a second code segment for providing access to stored audio data representing narration of definitions for words in said text, wherein more than one definition is stored for any word used within said text in more than one context;
    and a third code segment for associating words in said text with said definitions, respectively, such that a word with more than one definition is associated with a corresponding contextual definition thereof; and
    a fourth code segment for, in response to user selection of a particular word from said text,
    retrieving the stored audio data representing the definition associated therewith, and
    generating an audio narration from the retrieved audio data.

13. Apparatus for improving reading proficiency, comprising:
    means for displaying a text on a video screen;
    means for providing access to stored audio data representing narration of definitions for words in said text, wherein more than one definition is stored for any word used within said text in more than one context;
    means for associating words in said text with said definitions, respectively, such that a word with more than one definition is associated with a corresponding contextual definition thereof; and
    means for, in response to user selection of a particular word from said text,
    retrieving the stored audio data representing the definition associated therewith, and
    generating an audio narration from the retrieved audio data.

* * * * *